(No Model.)
W. E. PEARSON.
MEANS FOR SEPARATING OIL AND SEDIMENT FROM FEED WATER.
No. 374,879. Patented Dec. 13, 1887.
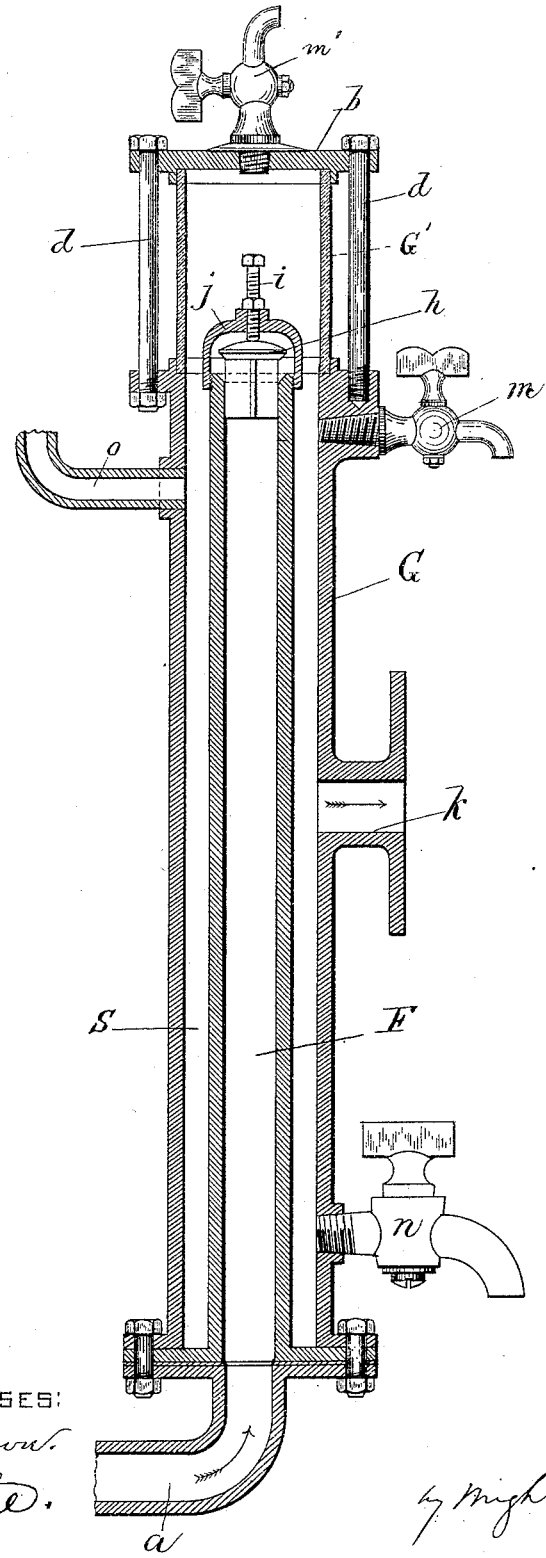
WITNESSES:
INVENTOR:

UNITED STATES PATENT OFFICE.

WILLIAM E. PEARSON, OF SAUGUS, ASSIGNOR TO NATHAN H. DANIELS, OF BOSTON, MASSACHUSETTS.

MEANS FOR SEPARATING OIL AND SEDIMENT FROM FEED-WATER.

SPECIFICATION forming part of Letters Patent No. 374,879, dated December 13, 1887.

Application filed July 5, 1887. Serial No. 243,456. (No model.)

*To all whom it may concern:*

Be it known that I, WILLIAM E. PEARSON, of Saugus, in the county of Essex and State of Massachusetts, have invented certain new and useful Improvements in Means for Separating Oil and Sediment from Feed-Water for Steam-Boilers, of which the following is a specification.

This invention has for its object to provide means for removing sediment and oil from feed-water supplied to steam-boilers, and particularly to the boilers of surface condensing-engines, and in all cases when exhaust-steam is used for boiler-feeding purposes. The oil used to lubricate the cylinder is carried by the exhaust-steam into the feed-water, and other foreign matter finds its way into the feed-water from the same source, and it is highly desirable to remove such oil and foreign matter before the feed-water enters the boiler.

My invention consists in the improved device hereinafter described, whereby the oil and other foreign matter may be separated from the feed-water while the latter is on its way to the boiler.

The accompanying drawing, forming a part of this specification, represents a vertical section of my improved separator.

In the drawing, *a* represents the pipe, through which the feed-water, with whatever oil and other foreign matter it may contain, passes on its way to the boiler. The pipe *a* is connected to the lower end of the separator, which is composed of an inner tube, F, forming a continuation of the pipe *a*, and an outer casing, G, which is separated from the inner tube, F, by an annular space, S, and is provided above the upper end of said inner tube with a glass section, G', forming a transparent chamber or receptacle for oil. A cap, *b*, secured to the upper end of the casing G by bolts *d d*, closes the upper end of the glass section, and has a cock, *m'*, through which air may be permitted to escape from the glass chamber G'. When the cock *m'* is closed, air cannot escape from the glass chamber. It is desirable to have a confined air-space at the top of said chamber, and the cock *m'* permits the air to be released to regulate the depth of said space, which should not extend below the glass chamber G'. The inner tube, F, has at its upper end a valve, *h*, which is arranged to be lifted from its seat by the water passing upwardly through said tube, and to be closed upon its seat and obstruct said tube by pressure in the casing G and glass chamber G'. A set screw, *i*, in a cage or spider, *j*, over the valve *h*, limits the opening movement of said valve, and may be adjusted to vary the extent of said movement.

*k* represents a branch from the casing G, through which the water passes from the annular space S to the boiler. Said branch or outlet is considerably higher than the bottom of said annular space, so that all of said space below the outlet constitutes a settling basin or pocket in which the heavier foreign matter in the water is precipitated.

It will be seen that the water forced through the pipe *a* passes upwardly through the central tube, F, into the oil-chamber G', and from thence downwardly through the annular space S to the outlet *k*. The oil contained in the water accumulates in the glass chamber G', where it can be observed, and from which it can be drawn off from time to time through a cock, *m*, at or below said chamber.

The accumulation of sediment in the annular space S below the outlet *k* may be blown out from time to time through a cock, *n*, near the lower portion of said space by steam introduced for that purpose through a pipe, *o*, entering the annular space S near its upper end. The pressure of the steam closes the valve *h*, and so prevents back-pressure in the pipe *a*.

It will be seen that by this device the oil and sediment may be effectually separated from feed-water while the latter is on its way to the boiler, and without loss of time.

It is obvious that the separator may be used without the blow-off cock *n* and steam-supply pipe *o* for separating oil from feed-water.

Instead of making the oil receptacle or chamber entirely of glass, it may be made of metal with a light of glass or a glass gage-tube inserted in one side.

I claim—

1. The herein-described separator for feed-water, consisting of the inner tube coupled to a supply-pipe and the outer casing communicating at its upper end with the upper end of the inner tube, and having an oil-receiving space at its upper end, a draw-off cock communicating with said space, and a feed-water outlet below said cock and below the upper end of the inner tube, as set forth.

2. The herein-described separator for feed-water, consisting of the inner tube coupled to a supply-pipe and the outer casing communicating at its upper end with the upper end of the inner tube, and having an oil-receiving space at its upper end, a draw-off cock at or below said space, a feed-water outlet below said cock, a blow-off cock below the outlet, and a steam-supply pipe above the blow-off cock, as set forth.

3. In a separator for feed-water, the combination of the inner tube having a valve, $h$, at its upper end and the outer casing having the steam-supply pipe $o$, the outlet $k$, and the blow-off cock $n$, as set forth.

4. In a separator for feed-water, the combination of the inner tube and the outer casing having the oil-chamber, the air-cock $m'$, the oil draw-off cock $m$, and the feed-water outlet $k$, all relatively arranged substantially as described.

5. In a separator for feed-water, the combination of the inner tube, the outer casing separated from said tube by an annular space, the glass receptacle at the upper end of said casing, the draw-off cock $m$, and the feed-water outlet $k$ in said casing, all relatively arranged substantially as set forth.

In testimony whereof I have signed my name to this specification, in the presence of two subscribing witnesses, this 24th day of June, A. D. 1887.

WILLIAM E. PEARSON.

Witnesses:
C. F. BROWN,
ARTHUR W. CROSSLEY.